United States Patent Office 3,110,092
Patented Nov. 12, 1963

3,110,092
SILICIDE COMPOSITION AND METHOD OF MANUFACTURE
Max F. Bechtold, Kennett Square, Pa., and Ernest L. Little, Jr., Harry J. McCauley, and Frank J. Penoza, Wilmington, Del., assignors to E. I. du Pont de Nemours and Company, Wilmington, Del., a corporation of Delaware
Filed Dec. 23, 1960, Ser. No. 78,102
11 Claims. (Cl. 29—182.5)

This invention relates to the manufacture of metal silicide compacts, and particularly to a method and composition for the manufacture of metal silicide compacts in the form of shaped objects having a high inherent lubricity such as is required in hot metal extrusion die nibs, bearings and other articles as to which there is metal-to-metal contact at elevated temperatures.

There is a steadily growing need for metal-forming apparatus, bearings and other devices exhibiting a low coefficient of friction coupled with high temperature and erosion resistance, and resort has been had to a variety of refractory materials for this purpose. However, there has been a marked deficiency with respect to inherent lubricity, especially, by which is meant the slipperiness displayed by a material. In addition, it has proved very difficult, if not impossible, to form these substances with apertures such as bores, partial bores, or even generally concave surfaces, due to inherent brittleness, hardness, abrasiveness and other unfavorable characteristics and this is particularly true where the apertures must be formed to high dimensional precision and are, in service, subjected to terrific loading stresses and temperatures, such as exist with hot metal extrusion die nibs and, in extreme cases, with bearings. Finally, most refractory materials are low in tensile strength and are difficult to mount in supports giving the necessary back-up strength.

It is an object of this invention to provide a composition and method for the manufacture of improved compacts of high inherent lubricity and toughness consisting mainly of one or more of the metal silicides. It is another object of this invention to provide a metal silicide compact which is amenable to the inclusion of apertures in the structure. It is a further object of this invention to provide a composition which is adapted to the fabrication of hot metal extrusion die nibs, bearings and similar structures having high dimensional stability and relatively low cost. Another object of this invention is the provision of a method of manufacture of articles which are to be ultimately provided with apertures in a wide variety of orifice patterns ranging from relatively simple to quite complex. The manner in which these and other objects of this invention are attained will become apparent from the following detailed description and the drawings, in which:

Generally, this invention comprises a composition useful in the fabrication of compacts which have a high inherent lubricity and improved toughness consisting essentially of 14–57% Si, 14–65% individually of at least two metals taken from the group consisting of iron, groups IV–A, V–A and VI–A of the periodic table, and from about 5–20% of a metal oxide taken from the group consisting of $ZrO_2$, ZnO and $Cr_2O_3$, and also a method of manufacturing such compacts.

The periodic table element designation herein employed is that set forth in "Textbook of Chemistry" (2d Ed.), 1956, by Mack, Garrett, Haskins and Verhoek, publisher Ginn & Co., page 311, according to which group IV–A consists of Ti, Zr and Hf, group V–A consists of V, Nb (previously Cb) and Ta, and group VI–A consists of Cr, Mo and W. Certain of the ternary metal systems employed according to this invention can be conveniently referred to in abbreviated form by combining the conventional chemical symbols in phonetic arrangements in a manner represented by the Fe-Mo-Si system, for example. This, of course, is the iron-molybdenum-silicon system taught in U.S. Patent 2,866,259. Similarly, the systems Fe-Si-Ti and Mo-N-Si-Ti are hereinafter referred to, these being taught in U.S. Patent 2,878,113 and in U.S. application Serial No. 773,087, respectively, now forfeited which relate to the manufacture of objects resistant to oxidation and high temperatures. Yet other metal systems within the scope of the general statement of this invention and the claims are also utilized according to this invention but do not, thus far, have coined names for their rapid identification. In any case, we have now found that incorporation of a substantial amount, e.g., 5–20% of a metal oxide taken from the group consisting of $ZrO_2$, ZnO and $Cr_2O_3$ in these metal systems, which systems or metal oxides can be employed either singly or in admixture one with another, enhances the lubricity of compacts made therefrom. Moreover, the metal oxides appear to be useful additionally in that they prevent cracking or disintegration during the high pressure consolidation necessary to the production of high density compacts of good strength and erosion resistance.

The metal oxide additive is advantageous also from the standpoint of aperture formation in the compacts and this is true for both the situation wherein the apertures are molded, at least in the rough, during the consolidation in which the compact itself is formed or where the apertures are formed in the compact by later machining operations. In addition, the metal oxide additives appear to impart a toughness to the compacts which enable them to withstand stresses imposed on them during pressing or shrinking occurring in the mounting of the compacts within the support housings.

From the standpoint of use, however, the most surprising advantage achieved by this invention is the combination of high lubricity of surface coupled with toughness and extremely high wear resistance of the compacts, making it possible to dispense with lubricants either entirely, or substantially entirely, during severe metal-contacting service such as that involved in hot metal extrusion operations.

This invention is hereinafter described with particular reference to the manufacture of hot metal extrusion die nibs, because the fabrication of these devices requires, to an exceptional degree, the overcoming of problems of precise dimensional control, the formation of apertures in the compacts and the like which are common to other structures such as bearings and similar apertured devices as to which this invention is also applicable. In all cases, powdered metallurgy techniques are employed in the manufacture, the compositions of this invention consisting in original, unsintered form of metal powder mixtures which are, however, converted to interacted multi-component alloys during the sintering by conjoint use of heat and pressure. Thereafter, for use as die nibs, the compacts are mounted in suitable support housings, such as described in copending U.S. application Serial No. 78,165, filed of even date herewith, which confer uniform high strength support for the silicide compositions over the wide temperature ranges in which hot metal extrusions are conducted.

Metal forming by the extrusion technique is particularly advantageous from the following standpoints: the ability to form relatively complex shapes in a single pass, easy change-over from one shape product to another, short lead time in production, ease of design change, reduced working capital and increased processing yields. However, it has not hitherto been practicable to provide extrusion die nibs with sufficiently long life and dimensional stability to permit the competitive extrusion shaping of steels, brasses and some of the less commonly encountered elemental metals, such as niobium (previously columbium), for example. In accordance with the accepted usage in the art, the term "die" is hereinafter employed as the designation for the assembled mount together with its extrusion element per se, which latter is called the "die nib," or simply the "nib."

Hitherto, the use of lubricants has been considered to be almost axiomatic in hot metal extrusion practice. For metals which can be worked at temperatures under about 500° C., such as Al and Mg, for example, hydrocarbon oils have been used as extrusion lubricants. However, for the higher temperatures required for the extrusion forming of copper, steel, ferrous alloys, and refractory metals, such as niobium, for example, there is difficulty in finding a lubricant which possesses suitable viscosity and stability. Graphite is widely used for the coating of the metal feed input passages, which are referred to in the art as the "containers," leading to the die nibs, and sometimes the die nibs themselves; however, graphite does not provide the continuously moving film possessed by a fluid lubricant. Recently, molten glasses, molten salts, clay-graphite mixtures and specially compounded greases have aided metal extrusions in the higher temperature range above 1000° C., but these also have been deficient in that the lubricant film has not been continuously maintained and, where it has failed, there has been objectionable galling of the extrudate accompanied by accelerated and uneven wear on the die nibs. Lubricant failure in the extrusion of soft metals, such as aluminum, can oftentimes be tolerated from the standpoint of die nib wear, because the nib life remains still quite long; however, where steels, ferrous alloys and refractory metals are being extruded, the nib life is drastically reduced and is frequently measured in terms of only 1–10 pushes per die nib.

The importance of die nibs of maximum resistance to erosion is evident, because the dimensional tolerance and surface finish of the extrudate product is directly dependent thereon. It is at least equally important, though, to eliminate lubricants in all extrusion work if at all possible, since lubricants remaining on the product are a contaminant which must thereafter be removed by degreasing, or even by grit blasting and pickling in the case of glass lubricants, which is expensive, time-consuming, and frequently harmful to the product because of corrosion, oxidation promotion or the like. Finally, lubricant failure becomes more serious where the extrudate product has fins, projections, sharp edges, re-entrant angles and other shape peculiarities, because the lubricant cannot readily adapt itself to accommodation of these features. The trend, however, is to produce by metal extrusion products which are increasingly complex in cross-sectional profile, and thus there is a clear necessity for lubricant elimination in view of this consideration also.

In making up the compositions of this invention it is completely practicable, and most economical, to start with binary alloy materials, however, elemental constituents can also be used in conjunction with one or more binary allows which contribute either a portion of the same ingredient or two or more of the other ingredients, so that there is considerable flexibility in this regard. The conversion of the powdered compositions to solid compacts as hereinafter described generally involves calorescence (i.e., an exothermic reaction characterized by an increase in temperature as evidenced by an increase in luminosity) that is induced when a considerable portion of the consolidated powder is heated to a temperature of at least 900° C. The internal temperature of the mass during this conversion reaches 1100°–1600° C. When the spontaneous heat increase due to calorescence is low, the temperature to achieve conversion must be raised by external heat application. The metal Si is so exothermic in its reaction with other metal constituents that it can generate extreme heat, which sometimes even appears capable of vaporizing some of the constituents. Accordingly, it is preferred that at least a part of the Si be utilized according to this invention as a compound with some other element, e.g., as ferrosilicon, titanium disilicide, silicon nitride or the like.

Thus, typical starting materials include for example, commercial grades of ferrosilicon, silicon nitride, ferrotitanium, titanium disilicide, silicon titanium, and elemental molybdenum, titanium, and iron. The purity of the binary alloys listed is generally of the order of 90–95%, whereas that of the elemental metals is usually appreciably better at 99%, or even higher. Nevertheless, compacts such as die nibs made from the relatively impure commercial binary alloys have proved completely satisfactory in service, even though the commercial binary alloys sometimes contain as much as 10% of other elements, which are, however, merely inert diluents, e.g., Al, Mn, Ca, Mg, Cu and Ni, as elements or oxides, in the case of the Fe-Mo-Si and Mo-N-Si-Ti systems as described in U.S. Patent 2,866,259 and U.S. application Serial No. 773,087, respectively, and even up to 15% as regards the Fe-Si-Ti system, as described in U.S. Patent 2,878,113. For best results, it is preferred that these inert substances be below about 5%, or even better, below 3% in the starting materials as received. As a matter of convenience in hereinafter reporting compositions, most are given in percentages by weight of essential ingredients only, i.e., ignoring the content of any other materials which may be present as inert diluents as hereinbefore described. Moreover, it will be understood that the ball milling size reduction operation hereinafter described inevitably adds a small amount of silica or alumina, and perhaps minor amounts of other substances, as a consequence of attrition of the grinding elements.

The mesh of all binary alloys and elemental metals as received varied from about 20 to about 325, whereas the metal oxides $ZrO_2$, $ZnO$ and $Cr_2O_3$ had particle sizes of 600 mesh and purities of 99% or higher. It is necessary to reduce all ingredients to the uniform, fine particle size hereinafter described, and it is convenient to use conventional ball mills for this size reduction, although it will be understood that fluid energy mills or other grinding apparatus can also be used for the purpose if desired. The metal oxides can be mixed with the other ingredients prior to grinding, to utilize the grinding dispersion to obtain uniform particle distribution. However, there is some indication that a tendency towards segregation of the vitreous phase hereinafter described is avoided by mixing, as dry powders, the pre-ground metal silicide ingredients (to which the NaOH hereinafter mentioned has been added) with the separately ground metal oxide using a conventional high speed electric blender. Thus, either practice is feasible.

The general procedure utilized in the following Examples was the same for each of the metal systems. This consisted of weighing out the air-dry powders and placing them all together in a 9" diameter 1 gallon porcelain ball mill jar, with or without benzene added, as the situation required. A liquid additive such as commercial grade benzene, cyclohexane, acetone or similar hydrocarbons, for example, appears to be beneficial in that it prevents the powder from compacting during the ball milling. The grinding balls or cylinders were then added to the jar and milling was commenced at preselected constant rotational speeds and for preselected times. At the conclusion of the milling cycle, the benzene was evaporated. At this point, following the practice of the patents and patent application hereinbefore identified, a small amount of 1–5% NaOH aqueous solution was added to the powders. The mixed powders were then dried to a moisture content of less than about 3%, crushed and passed through a 200 mesh screen, after which they were ready for use in compact (die nib) fabrication.

Electron microscope examinations of the individual mixtures revealed that most particles were 1–3 microns in size, although an appreciable number were below 1 micron and there were a few somewhat larger, in the extreme case up to about 10 microns. Particle size control within this range is preferred for best results; however, acceptable products are obtained where the particle size is less than about 75 microns, of which at least 75% by weight are less than about 5 microns.

The individual powder mixtures were stored in glass bottles provided with plastic caps and were stable, in that storage for weeks or even months prior to use in compact manufacture revealed no deterioration. It is preferred, however, to store the powders in an air-conditioned room maintained at a temperature of about 24° C. and a relative humidity of about 40% to maintain the physical handling properties unaltered, which is an aid in the later manufacturing operations.

In the following examples $ZrO_2$ is the specific metal oxide additive reported; however, the procedures are, in all cases, identical for the situations where ZnO and $Cr_2O_3$ are employed.

EXAMPLE A

The procedure for Mo-rich-Fe-Mo-Si powder preparation is described specifically for the nominal 20Fe60Mo20Si composition with 10% $ZrO_2$ added.

1080 gms. of Mo powder, 720 gms. of ferrosilicon (nominally 50% Fe, 50% Si) and 200 gms. of $ZrO_2$ were placed in a porcelain jar along with about ⅓ of the jar volume (1262 cc. random packed) of ¾" dia. flint (silica) pebbles, plus 1000 cc. of benzene. The norminal dry percentage composition of this mixture was thus 18.2Fe54.5Mo18.2Si9.1ZrO₂

The jar was sealed and rotated at 67 r.p.m. for 72 hrs. on a ball mill frame. After milling, the contents of the jar were discharged onto a porcelain tray, the benzene evaporated and the flint pebbles separated from the powder by coarse screening. Following this, 1050 cc. of 4.76% aqueous NaOH solution was stirred into the powder, which was then oven-dried for 2 hrs. at 110° C., crushed with a mortar and pestle, and screened through a 200 mesh screen, after which the powder was stored in glass jars until nibs were to be made up therefrom.

EXAMPLE B

The procedure for Mo-lean Fe-Mo-Si powder preparation was identical with that described for Example A, except that the nominal composition of the starting material was 33.3Fe33.3Mo33.3Si+10% $ZrO_2$ which thus, had the mixed nominal dry percentage composition of 30.3Fe30.3Mo30.3Si9.1ZrO₂.

EXAMPLE C

The procedure for Fe-Si-Ti powder preparation is described specifically for the composition 24Fe31Si39Ti and 6 inerts, to which 10% of $ZrO_2$ was added.

652 gms. of ferrotitanium (nominally 30% Fe, 70% Ti), 1196 gms. of silicotitanium (nominally 50% Si, 50% Ti), and 206 gms. of $ZrO_2$ were placed in a porcelain jar with ⅓ of the jar volume (1262 cc. random packed) of ¾" dia. x ¾" long "Borundum" ($Al_2O_3$) cylinders. The dry percentage composition of this mixture was thus 21.8Fe28.2Si35.5Ti9.1ZrO₂ 5.40 inerts.

The jar was sealed and rotated at 67 r.p.m. for 64 hrs. on a ball mill frame. After milling, the "Borundum" cylinders were removed from the powder by coarse screening and 1050 cc. of 4.76% aqueous NaOH solution was stirred into the powder mixture. The product was oven-dried for 2 hrs. at 110° C., crushed with a mortar and pestle, and screened through a 200 mesh screen, after which it was stored in glass jars.

EXAMPLE D

The procedure for Mo-N-Si-Ti powder preparation is described specifically for the nominal 49Mo5N28Si18Ti composition, to which 10% of $ZrO_2$ was added.

443 gms. of Mo metal powder, 349 gms. of titanium disilicide (nominally 46% Ti, 54% Si), 118 gms. of silicon nitride (nominally 60% Si, 40% $N_2$) and 99 gms. of $ZrO_2$ were placed in a porcelain jar with ⅓ of the jar volume (1262 cc. random packed) of ¾" dia. x ¾" long "Borundum" ($Al_2O_3$) cylinders and with 1000 cc. of benzene. The nominal dry percentage composition of this mixture was thus 44.4Mo4.55N25.5Si16.36Ti9.1ZrO₂.

The jar was sealed and rotated at 67 r.p.m. for 48 hrs. on a ball mill frame. After milling, the contents of the jar were poured onto a porcelain tray, the benzene evaporated and the "Borundum" cylinders removed from the mixture. The product was then oven-dried for 2 hrs. at 110° C., crushed in a mortar and pestle, passed through a 200 mesh screen and stored in glass jars.

Figures 1, 1A, 2, 3, 4:
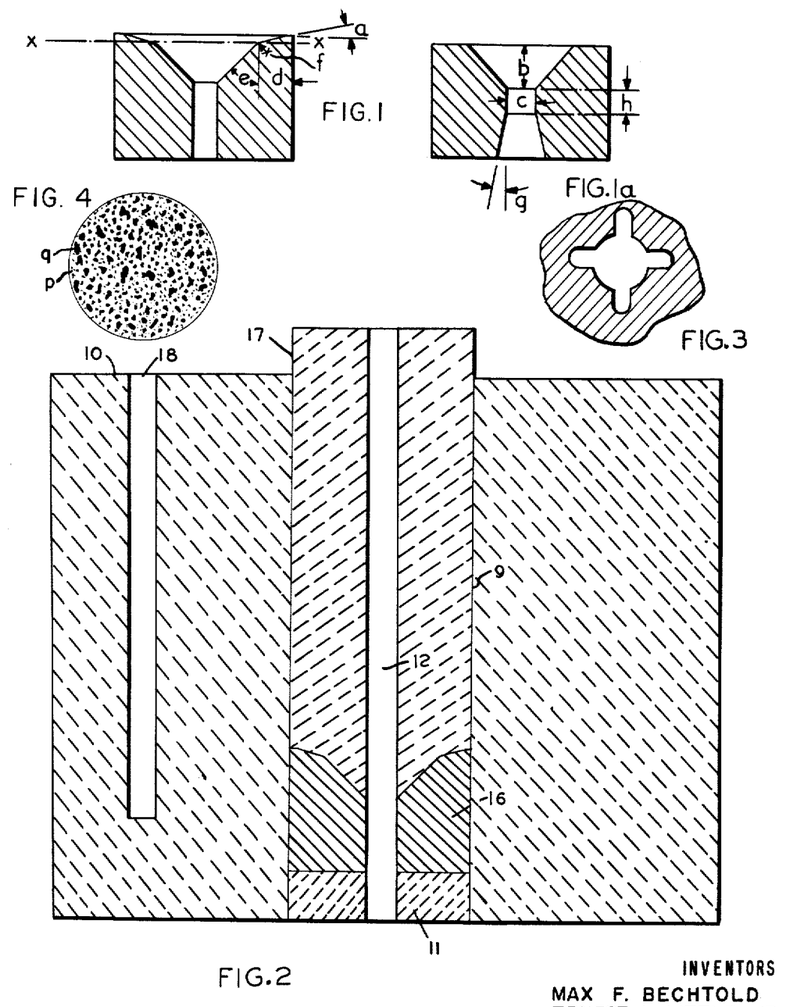
FIG. 1 is a vertical sectional view of a preferred as-pressed shape of compact for the manufacture of a die nib according to this invention wherein cross-hatching has been partly omitted to better show the several dimensional attributes.
FIG. 1a is a vertical sectional view of the compact of FIG. 1 in the as-finished form of a die nib and in condition to be mounted in a suitable holder for metal extrusion, the flare of the discharge opening being somewhat exaggerated to show this detail.
FIG. 2 is a vertical sectional view of a preferred embodiment of graphite die mold adapted to the manufacture of compacts of the design shown in FIG. 1.
FIG. 3 is a fragmentary view in transverse section through the extrusion throat of a special design of die nib adapted to form fluted metal rods by hot extrusion.
FIG. 4 is a sketch copying a small section of a 100× photomicrograph of an unetched metallographic specimen cut from a typical hot metal extrusion die made from the composition 20Fe60Mo20Si to which 10% $ZrO_2$ was added.

Turning now to the die nib manufacture per se, all of the extrusion dies described herein were provided with nibs which had the as-pressed shape of FIG. 1 and were thereafter finished to the final shape of FIG. 1a, after which they were mounted in suitable support housings and were then ready for use in metal extrusion. It will be understood that an extremely wide variety of die nib shapes can be fabricated according to this invention, and that some shapes perform better than others as regards specific metals to be extruded, reduction ratios, rate of extrudate throughput, extrusion temperatures, whether or not lubricants are used during the extrusion and many other considerations; however, the nib shape shown was settled upon to permit evaluation of test results without complication introduced as a result of variations in nib profiles. It might be further said that the design of FIGS. 1 and 1a proved to be highly effective in a wide variety of metal extrusions and, therefore, can well be utilized for any hot metal extrusions as to which knowledge of the effects of existing conditions are scanty or unknown.

In most cases the nibs, tested as hereinafter described, measured, in the finished form shown in FIG. 1a, 1¾" dia. x 1" long. The extruding inlet was provided with a frusto-conical mouth sloped at an angle of about 45° and of a depth $b$, which measured 0.40". The length $h$ of the straight cylindrical throat $c$ was from $\frac{1}{16}"-\frac{1}{8}"$ in all cases and the surfaces of both the inlet and the throat were ground and polished to a high finish. These throats were formed to three different diameters: $\frac{3}{16}"$, $\frac{1}{4}"$ and $\frac{5}{8}"$ for the nibs of Tables III, I and II, respectively. The extruding outlet was shaped to an outwardly expanding taper $g$ of 2–5°, the degree of taper within the limits given being rather non-critical.

It was found that the best compaction in manufacture was obtained by pressing the nibs first into the shape of FIG. 1, in which they were also sintered and inter-alloyed and thereafter machining them into the shape of FIG. 1a. The profile of bell mouth shown in FIG. 1 is actually that formed by two concentric frusto-conical surfaces, the outer one of which is inclined to the horizontal at an angle $a=15°$ whereas the inner one is inclined to the vertical at angle $e=45°$. These two surfaces intersect in a toroidal surface which is formed to a radius $f$ of 0.02", the lower extremity of which surface is located on the level of line $x—x$ a distance $d=\frac{5}{32}"$ inwardly from the outside circumference of the nib body as pressed. The specific profile of bell-mouth described appears to be particularly advantageous from the standpoint of ready disengagement of the compaction mold piston. As indicated in FIGS. 1 and 1a, the top of the nib is ground off on line $x—x$ as a finishing operation to obtain the nib form of FIG. 1a. The throat in the nib as-pressed is a straight cylindrical length about 0.010" undersize diametrically to provide for the grinding and polishing to the final condition of FIG. 1a.

The nibs were formed by molding within a graphite die mold which, as shown in FIG. 2, comprises a cylindrical body 10 about 5½" in height provided centrally with a bore 9 of the same size as the unfinished outside diameter of the die nib it is desired to form. Bore 9 constitutes the mold cavity and is provided at the lower end with a close-fitting annular graphite base plate 11 drilled centrally to receive a solid cylindrical graphite core piece 12 of a diameter equal to that of the unfinished throat $c$ of the nib to be formed. The bore is also provided with a close-fitting plunger 17 formed at its lower end with a concave surface which is the exact reverse configuration of the bell mouth of FIG. 1 which is to be formed in the nib. To permit easy relative movement of plunger 17 axially with respect to core piece 12, a clearance of 0.001"–0.0015" is provided therebetween. Finally, a ⅝" diameter thermocouple well 18 is preferably provided in body 10.

In nib manufacture, it will be understood that a complete weighed and mixed powder charge, such as one of the compositions of Examples A–D, inclusive, is first placed within bore 9, closed at the bottom by base plate 11 and provided with core piece 12, if the die throat is to be preformed. The charge is then tamped manually with the aid of plunger 17 until enough powder has been introduced into the mold to produce a nib of the length desired. At this point the entire mold and its charge is placed upright within a hydraulic press and pressure applied to plunger 17 while base plate 11 is supported in place by the press platen and the entire die mold is heated, preferably by electric induction heating, until the alloying and sintering hereinbefore described is completed. It is preferred to shield the die mold with two or more thicknesses of asbestos paper wrapped circumferentially around the outside of body 10, and also on the top and bottom surfaces of the die mold, to preserve uniform temperature conditions within the die mold and, at the same time, protect the mold from oxidation by the air.

A preferred procedure for the manufacture of Fe-Mo-Si die nibs is to apply downward pressure on plunger 17 in increasing increments. Thus, with the die mold cold, 1000 p.s.i. is applied at room temperature, and this pressure maintained quite steadily until the die mold reaches 1000° C., as indicated by a thermocouple mounted in well 18. At this point the pressure is increased to 2000 p.s.i. and this is continued substantially unchanged until the die mold temperature reaches 1300° C., when the pressure is increased to its highest level, e.g., 3000 p.s.i., and held at the latter value for about 15 minutes. The alloying-sintering has now been completed and good homogeneity has been obtained by this time, so that heating can be discontinued and the graphite die mold removed from the induction heating apparatus.

Core pin 12 is then removed from the hot mold by forcing it out with an arbor press, after which the hot mold, still containing the nib within its cavity, is placed within a metal container which is loaded with alumina spheres. The mold is covered with the spheres, which shield the mold from oxidation, and allowed to cool to room temperature, after which the mold is placed in an arbor press and plunger 17 pushed downwardly without support applied to the underside of base plate 11. This forces plate 11 and sintered nib 16 out of the bottom of the graphite mold, after which the mold can be reloaded to make another nib. It will be understood that the mold and its appurtenances can be used over and over again indefinitely.

The surface areas of the nib are belt-sanded and, thereafter, ground to parallel surfaces at top and bottom, as well as to desired height, using a silicon carbide or diamond grinding wheel. The frusto-conical inlet and the nib throat are then finished, both as regards surface quality and dimensions. Finally, the nib is formed circumferentially to fit within an elastic metal support housing as described in copending U.S. application Serial No. 78,165, hereinbefore mentioned, after which the complete die is ready for hot metal extrusion service.

It is preferred to mold-form the nib throats, at least to rough prefinished state, in the course of manufacture of the nibs themselves, because in this way complex extrusion passages can be formed by simply machining the mating reverse configuration on the outside of the easily machinable graphite core pin 12. One such intricate transverse throat profile is that shown in FIG. 3, which was adapted to produce fluted extruded rods of copper, steel, tool steel and niobium. However, if desired, the nib extrusion passages can be formed by electrospark machining, diamond boring, or ultrasonic machining, and several of the nibs of Table I were so fabricated.

Each nib was subjected to a searching visual inspection for cracks or other flaws before being passed to extrusion testing, so that any cracking occurring as a result of mounting in the support housings, finishing or in the extrusion itself could be identified.

*Table I*

The following is a tabulation of examples of a number of extrusion die nibs which were made up from the several ingredient systems denoted, to each of which was added 10% $ZrO_2$ prior to the ball milling operation. The final form nibs were in all instances of the design shown in FIG. 1a and measured 1¾" outside dia. x 1" long with a ¼" throat diameter. Typical times employed to raise to sintering temperature are given for some of the examples as well as densities of product and Rockwell A hardness (usually in duplicate). In all instances the nib orifice was shaped by the use of a graphite core during the hot pressing sintering operation, except in the case of Examples III and V, where the hole was drilled by electro-spark machining, using a conventional "Elox" apparatus.

Table I

| Example No. | Ingredient System Expressed in Nominal Percent | Sintering Temp., °C. | Soak Time, mins., at Sintering Temp. | Pressure, lbs./sq. in. Imposed During Sintering | Density, gms./cm.³ | Rockwell A Hardness |
|---|---|---|---|---|---|---|
| I | 20Fe60Mo20Si | 1,300 | 20 | 3,000 | 6.36 | 88, 90 |
| II | 20Fe60Mo20Si | 1,300 | 20 | 3,000 | 6.56 | 87 |
| III | 20Fe60Mo20Si | 1,300 | 25 | 3,000 | 6.43 | 86, 87 |
| IV | 20Fe60Mo20Si | 1,300 | 25 | 3,000 | 6.79 | 88, 89 |
| V | 20Fe60Mo20Si | 1,300 | 20 | 3,000 | 6.58 | 85, 86 |
| VI | 20Fe60Mo20Si | 1,300 | 20 | 3,000 | | 85, 86 |
| VII | 49Mo5N28Si18Ti | 1,675 | 10 | 3,500 | | 86, 91 |
| VIII [a] | 24Fe31Si39Ti | 1,300 | 5 | 3,000 | | 85, 86 |
| IX [a] | 24Fe31Si39Ti | 1,300 | 10 | 3,500 | | 85, 86 |
| X [b] | 24Fe31Si39Ti | 1,300 | 5 | 3,500 | | 86, 88 |

[a] VIII and IX: 55 mins. taken to heat each to sintering temperature using a 50 kw. induction furnace.
[b] X: 35 mins. taken to heat to sintering temperature using a 50 kw. induction furnace.

Table II

The following is a tabulation of extrusion die nibs which were made up from the ingredient system denoted, to which was added 10% of one of the metal oxides: ZnO for Example XI, $ZrO_2$ for Example XII and $Cr_2O_3$ for Example XIII prior to the ball milling operation. The nibs were as shown in FIG. 1a and measured 1¾″ outside dia. x 1″ long, with a ⅝″ throat diameter, the orifices being shaped by use of a graphite core during the hot pressing operation. Typical times employed to raise to sintering temperature are given, together with the same data as reported in Table I.

Table II

| Example No. | Ingredient System Expressed in Nominal Percent | Sintering Temp., °C. | Soak Time, mins., at Sintering Temp. | Pressure, lbs./sq. in. Imposed During Sintering | Density, gms./cm.³ | Rockwell A Hardness |
|---|---|---|---|---|---|---|
| XI [a] | 20Fe60Mo20Si | 1,300 | 5 | 3,000 | 6.22 | 85, 86 |
| XII | 20Fe60Mo20Si | 1,300 | 20 | 4,500 | 6.33 | 85, 86 |
| XIII [a] | 20Fe60Mo20Si | 1,300 | 5 | 3,000 | 5.98 | 87 |

[a] XI and XIII: 90 mins. taken to heat each to sintering temperature using a 20 kw. induction furnace.

Table III

The following is a tabulation of extrusion die nibs which were made up from the ingredient system 20Fe60Mo20Si to which were added the denoted percentages of $ZrO_2$ prior to the ball milling operation. The nibs were as shown in FIG. 1a and measured 1¾″ outside dia. x 1½″ long, with a ³⁄₁₆″ throat diameter, the orifices being shaped by use of a graphite core during the hot pressing operation. All of the nibs obtained were satisfactory with the exceptions noted.

Table III

| Example No. | Percent $ZrO_2$ | Sintering Temp., °C. | Soak Time, mins., at Sintering Temp. | Pressure, lbs./sq. in. Imposed During Sintering | Density, gms. cm.³ | Rockwell A Hardness |
|---|---|---|---|---|---|---|
| XIV | 5 | 1,300 | 20 | 3,000 | 6.47 | 85, 87 |
| XV | 10 | 1,300 | 20 | 3,000 | 6.23 | 85 |
| XVI | 20 | 1,300 | 20 | 3,000 | 6.33 | 85, 86 |
| XVII [a] | 40 | 1,300 | 20 | 3,000 | | 78, 82 |
| XVIII [b] | 40 | 1,300 | 40 | 2,500 | | |

[a] XVII: This nib cracked in the course of cooling after removal from the mold.
[b] XVIII: This nib contained many hairline cracks visible to the eye.

As indicated by Tables I, II and III, the relative proportions of metal oxide in the compositions can vary from about 5–20% by weight. When too high a content of metal oxide is utilized, such as the 40% $ZrO_2$ of Examples XVII and XVIII of Table III, cracking of the nib usually occurs during the fabrication, which destroys it completely.

Moreover, compacts made according to this invention, and in particular relatively complex apertured objects such as die nibs and the like, can be fabricated over a relatively wide range of temperatures and pressures. Thus, Fe-Mo-Si and Fe-Si-Ti to which $ZrO_2$ is added, can be sintered and alloyed readily at pressures of about 3000 p.s.i. and temperatures of about 1300° C. Mo-N-Si-Ti, on the other hand, requires somewhat higher temperatures, typically, 1650–1675° C., with a sintering pressure of about 3500–4500 p.s.i. Investigation has revealed that both temperature and pressure can be varied relatively widely with each of the metal systems hereinbefore described and, in general, the pressure range within which this invention can be practiced is about 1500–5000 p.s.i., whereas the temperature range is about 1250–1800° C.

The foregoing description is directed specifically to a single firing procedure for manufacture of compacts; however, it will be understood that intermediate compacts constituted from several, but not all of the ingredients, can be individually fired, crushed and subjected to a final firing with remaining ingredients to produce the ultimate compacts of this invention, all as taught in U.S. application Serial No. 817,974. Also, we have made up fully reacted and alloyed compacts, pulverized them, and resintered them into absolutely sound compacts having all of the beneficial properties of this invention. This latter is sometimes an advantageous procedure where the calorescence is so vigorous as to produce blow holes in the original compact, since the complete physical structure is reconstituted in dense, homogeneous condition by the second sintering.

An expeditious way of evaluating the properties of compacts made according to this invention without the necessity for fabricating expensive dies is the preparation of tool bits, and the following is a tabulation of the properties of typical species all made up by the general procedure of Examples A–C, but employing 60% $MoSi_2$, 30% of the individual metal ingredients identified and 10% of the individual metal oxides identified. The compacts formed by heat-pressure consolidation as hereinbefore described were all sound pieces measuring ⅝″ x ⅝″ x ¼″. The microstructures of specimens prepared from all of these compacts bore a close resemblance to the characteristic microstructure of FIG. 4, hereinafter described, although there were some variations in phase distribution and, in one instance, namely that of Ta plus $ZrO_2$, a separate phase exists which displays a geometrical shape. In all instances the compacts took sharp-edged shapes and were substantially indistinguishable in general properties from the compositions of Tables I–III from which dies were made.

*Table IV*

A. The metal oxide employed here was $ZrO_2$ in the amount of 10%.

| Composition | Density, gms./cm.³ | Rockwell A Hardness |
|---|---|---|
| 60MoSi₂30Ti10ZrO₂ | 5.41 | 86 |
| 60MoSi₂70Fe10ZrO₂ | 6.29 | 84, 85 |
| 60MoSi₂30Ta10ZrO₂ | 7.27 | 85 |
| 60MoSi₂30V10ZrO₂ | 5.85 | 85 |
| 60MoSi₂30Cr10ZrO₂ | 6.00 | 81, 82 |

B. The metal oxide employed here was $Cr_2O_3$ in the amount of 10%.

| Composition | Density, gms./cm.³ | Rockwell A Hardness |
|---|---|---|
| 60MoSi₂30Cr10Cr₂O₃ | 5.82 | 85 |
| 60MoSi₂30Ti10Cr₂O₃ | 5.45 | 87, 90 |
| 60MoSi₂30Ta10Cr₂O₃ | 7.50 | 85, 86 |
| 60MoSi₂30V10Cr₂O₃ | 5.27 | 86, 88 |

C. The metal oxide employed here was ZnO in the amount of 10%.

| Composition | Density, gms./cm.³ | Rockwell A Hardness |
|---|---|---|
| 60MoSi₂30Cr10ZnO | 5.57 | 85 |
| 60MoSi₂30Ti10ZnO | 4.70 | 86, 88 |
| 60MoSi₂70Ta10ZnO | 6.95 | 85, 87 |
| 60MoSi₂30V10ZnO | 5.85 | 86, 87 |
| 60MoSi₂30Fe10ZnO | 6.13 | 84, 85 |

The following is an example of the preparation of a compact from material which had previously been calcined above the calorescence temperature for the particular composition involved.

EXAMPLE E

A quantity of Mo-N-Si-Ti powder was calcined at 1700° C. to drive off volatile matter and to effect the silicide reaction through calorescence. The product, having the nominal composition 49Mo5N28Si18Ti, was crushed, ground and passed through a 200 mesh sieve. Then 15% by weight of $ZrO_2$ was added and a tool bit, measuring ⅝" x ⅝" x ¼" was hot-pressed from the mix using a graphite mold.

The sintering cycle was as follows: 1000 p.s.i. was applied at room temperature and maintained until the temperature of the induction-heated graphite mold reached 1200° C., at which point the pressure was increased to 2000 p.s.i. and maintained until the temperature rose to 1500° C., when it was increased to 3000 p.s.i. and increased again to 4000 p.s.i. at 1675° C. A time of 19 mins. was required to heat the mold from room temperature to 1675° C., and the mold was thereafter maintained under 4000 p.s.i. at 1675° C. for 10 mins. A good tool bit was obtained, which had a Rockwell A hardness of 89 and a density of 4.92 gms./cm.³.

In addition, mixed metal systems have proved entirely practicable and, in some instances, provide economies as regards materials, while still obtaining the benefits of the good properties conferred by individual relatively expensive components.

EXAMPLE F

An extrusion die nib was fabricated from mixed Fe-Mo-Si and Fe-Si-Ti systems as follows: The dry mixed powder was made up in an electrical blender from equal weights of pre-ground Fe-Mo-Si powder having the nominal composition 20Fe60Mo20Si with 10% $ZrO_2$ added and preground Fe-Si-Ti powder having the nominal composition 24Fe31Si39Ti 6 inerts with 10% $ZrO_2$ added. Then the nib was hot-pressed to rough form in a graphite mold as hereinbefore described, but in the following cycle: applying 1000 p.s.i. at room temperature and maintaining this pressure for the 7 mins. until the mold was heated by electrical induction to 1000° C., increasing the pressure to 2000 p.s.i. at 1000° C. and maintaining this level until 1200° C. was reached, and then increasing the pressure to 3000 p.s.i. and maintaining it there for 20 mins. while maintaining the temperature at 1300° C. A good die nib was obtained which had a Rockwell A hardness of 87, 88 and a density of 5.52 gms./cm.³.

The inherent lubricity possessed by compacts made according to this invention is demonstrated by the following hot metal extrusion tests conducted with specific die nibs hereinbefore identified. In many of the tests no lubricant whatever was employed whereas, in others, a suspension of very fine graphite in a light hydrocarbon, was used as a means of reducing the friction of feeding the billet through the steel directing sleeve, or "container," upstream from the die itself. In view of the limited amount of graphite-in-oil used, as well as the temperatures existing during the extrusion tests (at which the oil carrier flashes off), little or no lubricating effect persisted into, or during, the extrusion per se. This is confirmed by the fact that the extruded products were obtained with clean, bright finishes which required no post-extrusion cleansing, as compared with the visibly contaminated products of the prior art. Accordingly, all of the extrusions hereinafter reported can be considered substantially free of lubricant, even where a lubricant is reported as a preliminary to billet feed through the container.

The respective nib and billet temperatures reported in the following tests are those which existed at the commencement of extrusion work. The tendency is for apparatus and process material to all reach a common temperature during extended operation. In addition, there is, of course, a large amount of heat generated by the extrusion work itself, so that temperature conditions existing at any given time during the extrusion process are dependent on previous events.

The term "reduction ratio" is defined as the ratio of the cross-sectional areas of billet fed to extrudate product. The term "nib washout" refers to progressive enlargement of the nib mouth occurring as a consequence of extrusion.

TEST NO. 1

The nib of Example I, Table I, was utilized to extrude brass (analysis: 61.5% Cu, 35.5% Zn, 3% Pb) at a nib temperature of 850° F. and a billet temperature of 1300° F. The reduction ratio was approximately 20 to 1. The billets, as fed, were 2" long x 0.950" dia., which were reduced to an extrudate dia. of 0.223". The individual extrudate lengths varied from 30" to 40", and six extrusions were made through this nib without the use of any lubricant. The surface finish of the extrudate product was excellent and the cross-sectional dimension checked the same at each end. When the die was removed from service for examination, it was found that no cracks had appeared in the nib and there was also no nib washout.

TEST NO. 2

The nib of Example II, Table I, was utilized to extrude copper (99.99% pure) at a nib temperature of 850° F. and a billet temperature of 1500° F. The reduction ratio was approximately 20 to 1, the billets fed measuring 2" long x 0.950" dia., and the individual extrudate lengths were 30"–40" long. No lubricant was used. There were six extrusions to a product diameter of 0.223", with excellent surface finish and constant extrudate cross-section maintenance throughout. The nib showed no cracks or washout following the extrusions.

TEST NO. 3

The nib of Example III, Table I, was utilized to extrude A.I.S.I. 1018 steel with the nib temperature 850° F. and the billet temperature 2100° F. The reduction ratio was approximately 20 to 1, the billets fed being 2" long x 0.950" dia.

Two series of extrusions were made, the first consisting of seven 0.223" dia. extrusions in lengths of 30"–40" each using a glass lubricant which was sprinkled on to the feed stock as a powder 10 to 20 mesh size. This resulted in an irregular pressing pressure which caused the nib to crack circumferentially at the inlet end because of the stock sticking. The crack was upstream from the working area of the nib and out of contact with the billet, so that there was no effect on the extrusion.

The second series of tests dispensed with lubricant altogether, and six more extrusions of the same dimensional data as the first series were made on the same die. This resulted in smooth operation without any additional cracking of the nib and with excellent surface finish on the extrudate and no nib washout.

TEST NO. 4

The nib of Example IV, Table I, was utilized to extrude A.I.S.I. 1018 steel with the nib temperature 850° F. and the billet temperature 2100° F. The reduction ratio was approximately 20 to 1, the billets fed being 2" long x 0.950" dia. The extrudate lengths were 30" to 40" and twenty-three separate extrusions were made with the die using a very light application of graphite-in-oil to the container upstream from the die.

The extrudate had a good surface finish and checked diametrically in the range 0.221"–0.2215". Slight hair line cracks developed on the die nib during this test but none of the cracks were so serious as to have a detectable surface effect on the extrudate. No nib washout was noted.

TEST NO. 5

The nib of Example IV, Table I, was utilized after Test No. 4 to extrude H-13 tool steel with the nib temperature 850° F. and the billet temperature 2360° F. The reduction ratio was approximately 20 to 1, the billets fed being 2" long x 0.950" dia. with extrudate lengths of 30"–40".

There were eight separate extrusions using light graphite-in-oil application to the container upstream from the die. All extrudate rods checked diametrically at 0.218"–0.220" and had good surface finish. No additional cracks appeared in the nib, nor was any washout noted.

TEST NO. 6

A nib having the composition of Example VI, Table I, but with a throat diameter of 0.50" was utilized to extrude niobium metal with the nib temperature 850° F. and the billet temperature 2540–2640° F. The reduction ratio was approximately 4 to 1, the billets fed being 2" long x 0.950" dia. The extrudate lengths were 6" to 9" and two extrusions were made using light graphite-in-oil application to the container.

Slight hair line cracks developed on the nib, but excellent surface finish was maintained on the extrudate product and no nib washout occurred.

TEST NO. 7

Two separate nibs of the composition of Example VII, Table I, were utilized to extrude niobium metal with the nib temperature 1000° F. and the billet temperature 2400° F. The reduction ratio was approximately 8 to 1, the billets fed being 3½" in dia. by over 4" long. Extrudate bars 1¼" dia. and 24"–30" long were obtained.

One extrusion was made on each nib to ascertain the comparison between use of a powdered glass lubricant with one nib and no lubricant whatever on the other nib. It was found that the extrusion without lubricant was markedly superior in surface finish over the extrusion with lubricant and, further, that there was no washout with either nib.

TEST NO. 8

The nib of Example VIII, Table I, was utilized to extrude A.I.S.I. 416 stainless steel with the nib temperature 850° F. and the billet temperature 2300° F. The reduction ratio was approximately 20 to 1, the billets fed being 2" long x 0.950" dia. The extrudate lengths were 30"–40", and three extrusions were made using light graphite-in-oil application to the container.

No cracks developed on the die nib and the extruded product had a good surface finish. There was no die washout.

TEST NO. 9

A nib having the composition of Example I, Table I, was made up with an extrusion throat of cross-section shown in FIG. 3, i.e., with four fins disposed 90° apart around a circular central body. This nib was utilized to extrude niobium metal with the nib temperature 850° F. and the billet temperature 2660° F. The reduction ratio was approximately 3 to 1, the billet fed 2" long x 0.950" dia. and the extrudate length 4"–6".

One extrusion was made through the nib using a light graphite-in-oil application to the container. The surface finish obtained was excellent and there was no die washout.

TEST NO. 10

The shaped nib used in Test No. 9 was utilized additionally to extrude three metals in sequence therethrough, each at a higher temperature than its predecessor. The reduction ratio in all cases was the same at 9 to 1 and the billets fed were 2" long x 0.950" dia., with extrudate products about 18" long.

The sequence of the extrusions was as follows, a light graphite-in-oil lubricant being used on the container in all instances.

(a) Stock fed: 99.9% pure copper. The nib temperature was 850° F., the billet temperature 1500° F. Two extrusions performed. No nib cracking occurred and the surface finish of the extrudate was good.

(b) Stock fed: A.I.S.I. 1018 steel. The nib temperature was 850° F., the billet temperature 2100° F. Two extrusions were performed without any cracks developing in the nib and with good surface finish on the extrudate.

(c) Stock fed: H-13 tool steel. The nib temperature was 850° F., the billet temperature 2400° F. Two extrusions were performed, with good surface finish obtained on the product and no cracks developing in the nib.

TEST NO. 11

The nib of this test was Example XVI, Table III, containing 20% $ZrO_2$ which was utilized to extrude A.I.S.I. 303 stainless steel, the nib temperature being maintained at 850° F. whereas the billet temperature was 2360° F. The reduction ratio was 20 to 1, the billet fed was 2" long x 0.950" dia. and the extrudate length 30"–40".

Three extrusions were performed using a light graphite-in-oil application on the container. There was slight circumferential and axial cracking of the die nib and the extruded product surface was somewhat rough. No die washout was noted.

TEST NO. 12

The nib of this test had the composition of Example XI, Table II, i.e. 20Fe60Mo20Si plus 10% ZnO, and measured 1¾" outside dia. x 1" long with a 0.610" dia. throat. The nib was preheated to 850° F., at which time A.I.S.I 1018 steel was extruded therethrough, the billet size being 1⅜" dia. x 2⅜" long, and the billet temperature 2100° F. The reduction ratio was thus approximately 5 to 1.

Only one extrusioni without lubricant, was made through the die nib, because of operating difficulties with the press; however, the product, measuring 9" in length, had a good surface finish, nor did the nib show any cracks.

15
TEST NO. 13

The nib of this test had the composition of Example XIII, Table II, i.e., 20Fe60Mo20Si plus 10% $Cr_2O_3$, and measured 1¾" outside diameter x 1" long with a 0.610" dia. throat. A succession of extrusions without use of lubricants was made through the die nib which was, initially, heated to 850° F. prior to each, these being conducted, in the order recited, as follows:

(a) Hot extrusion of brass having the composition 61.5% Cu, 35.5% Zn, 3% Pb. Billet temperature 1300° F., billet size 1⅜" dia. x 2⅜" long, extrusion ratio 5 to 1. Three extrusions were made through the nib. The product lengths were 9" and the surface finish was good, nor did the nib develop cracks.

(b) Hot extrusion of 99.99% copper. Billet temperature 1500° F., billet size 1⅜" dia. x 2⅜" long, extrusion ratio 5 to 1. Three extrusions (each 9" long) were made through the nib. The nib did not crack and a good surface finish was obtained on the product.

(c) Hot extrusion of A.I.S.I. 1018 steel. The billet feed temperature was 2100° F., billet size 1⅜" dia. x 2⅜" long, and the extrusion ratio was 5 to 1. One extrusion 9" long was made through the nib, good surface finish being obtained without cracking of the nib.

(d) Hot extrusion of aluminum. The billet temperature was 850° F., billet size 1⅜" dia. x 2⅜" long, and the extrusion ratio was 5 to 1. One extrusion 9" long was made through the die without cracking the nib and with good surface finish on the product.

From the foregoing, it is apparent that compacts made according to this invention are possessed of a remarkable inherent lubricity, which makes it possible to extrude metal billets having temperatures up to about 6000° F. where suitably cooled die nibs are employed or, alternatively, where the extrusion is conducted at a high enough rate to complete it before there is destructive heat transmission to the die.

Extensive metallographic study under magnifications of 100–1000× on sections taken from die nibs and tool bits prepared in accordance herewith has consistently shown a microstructure such as that of FIG. 4, which is that of an unetched specimen at 100× taken from a die nib made up from the nominal composition 20Fe60Mo20Si to which 10% $ZrO_2$ was added. All of the compacts hereinbefore described possess two essential phases, the first, denoted $p$, being a white, hard, continuous phase having an approximate 1200 Knoop hardness at 100 gms. load, abbreviated $1200K_{100}$, whereas the second, denoted $q$, is a softer (ca. $600K_{100}$) black, discontinuous phase which is vitreous in nature. This vitreous phase is well dispersed in the matrix. A fine-grained microstructure in the compact also appeared to be beneficial, e.g., 1–10 micron size with an average grain size of 5 microns. From this last fact, it is seen that virtually no grain growth occurs during the hot pressing-sintering, the initial milled powders falling in the same 1–5 micron particle size.

One theory which can be postulated is that the dark vitreous phase becomes progressively less viscous as the temperature is raised, while still being retained in situ by the hard, strong, rigid matrix, so that it affords a lubricating action against sliding contact with the compact. Regardless of the true explanation, however, there is an established high-order lubricity evidenced during extremely severe tests, such as those represented by the hot metal extrusions described.

A statistical appraisal of sample performance in all aspects, extending from ease of hot-pressing, e.g., avoidance of sticking in the mold, elimination of cracking and the like, through mounting die nibs in ther holders, e.g., toughness and strength in resisting the stresses applied at this stage, to final performance as hot metal extrusion dies indicates that $ZrO_2$ is generally superior as an additive to either ZnO or $Cr_2O_3$. However, the demands of particular installations are so diverse and specialized that the latter two metal oxides can well have unique applications exclusive to each.

The ability to form intricately shaped compacts, such as the apertured nibs hereinbefore utilized as prime examples for purposes of this description, is an exceedingly important consideration. Industrial usage depends to a large extent on the ease with which objects can be shaped, and compacts according to this invention have been made in spherical form as well as with a variety of aperture shapes, curved surfaces and the like. It will be understood that it is oftentimes not necessary to prepare a die, bearing or similar structure as a unitary object, but that it can be fabricated as a multiplicity of interfitting segments which, in assembly together, make up the entirety. Such a design approach is entirely feasible in view of all of the desirable physical characteristics of the compositions of this invention.

From the foregoing, it will be understood that relatively wide modifications can be made in composition, manufacturing pressures, temperatures and other factors without departure from the essential spirit of this invention, and it is intended to be limited only by the scope of the following claims.

What is claimed is:

1. A powder metallurgy composition useful in the fabrication of shaped objects having high inherent lubricity and toughness consisting essentially of 14–57% Si, 14–65% individually of each of the metals Fe and Ti, and from about 5–20% of $ZrO_2$, wherein the size of all particles is less than about 75 microns and of which at least 75% by weight are less than about 5 microns.

2. A powder metallurgy composition useful in the fabrication of shaped objects having high inherent lubricity and toughness according to claim 1 containing additionally from about 1–12% by weight of chemically combined N.

3. As a manufacture, a shaped object having a high inherent lubricity and toughness comprising a powder metallurgy composition consisting essentially of 14–57% Si, 14–65% individually of at least two metals from the group consisting of Fe, groups IV–A, V–A and VI–A of the periodic table, and from about 5–20% of a metal oxide taken from the group consisting of $ZrO_2$, ZnO and $Cr_2O_3$, wherein the size of all particles is less than about 75 microns and of which at least 75% by weight are less than about 5 microns, sintered and alloyed to a substantially homogeneous composite.

4. A shaped object according to claim 3 containing additionally from about 1–12% by weight chemically combined N.

5. A powder metallurgy composition useful in the fabrication of shaped objects consisting essentially of 14–57% Si, 14–65% individually of at least two metals selected from the group consisting of Fe, group IV–A, V–A, VI–A of the periodic table, and from about 5–20% of a metal oxide taken from the group consisting of $ZrO_2$, ZnO, and $Cr_2O_3$, wherein the size of all particles is less than about 75 microns and of which at least 75% by weight are less than about 5 microns.

6. A powder metallurgy composition useful in the fabrication of shaped objects consisting essentially of 14–57% Si, 14–65% individually of each of the metals Fe and Mo, and from about 5–20% $ZrO_2$, wherein the size of all particles is less than about 75 microns and of which at least 75% by weight are less than about 5 microns.

7. A powder metallurgy composition useful in the fabrication of shaped objects consisting essentially of 14–57% Si, 14–65% Mo, 14–65% Ti, 1–12% N, and from about 5–20% $ZrO_2$, wherein the size of all particles is less than about 75 microns and of which at least 75% by weight are less than about 5 microns.

8. As a manufacture, a shaped object having a high inherent lubricity and toughness comprising a powder metallurgy composition sintered and alloyed to a substantial homogeneous composite; said powder metallurgy composition consisting essentially of 14–57% Si, 14–65% individually of each of the metals Fe and Mo, and from about 5–20% ZrO₂, wherein the size of all particles is less than about 75 microns and of which at least 75% by weight are less than about 5 microns.

9. As a manufacture, a shaped object having a high inherent lubricity and toughness comprising a powder metallurgy composition sintered and alloyed to a substantially homogeneous composite; said powder metallurgy composition consisting essentially of 14–57% Si, 14–65% individually of each of the metals Fe and Fi, and from about 5–20% ZrO₂, wherein hte size of all particles is less than about 75 microns and of which at least 75% by weight are less than about 5 microns.

10. As a manufacture, a shaped object having a high inherent lubricity and toughness comprising a powder metallurgy composition sintered and alloyed to a substantially homogeneous composite; said powder metallurgy composiiton consisting essentially of 14–57% Si, 14–65% Mo, 14–65% Ti, 1–12% N, and from about 5–20% of ZrO₂, wherein the size of all particles is less than about 75 microns and of which at least 75% by weight are less than about 5 microns.

11. A method for the manufacture of shaped objects having high inherent lubricity and toughness comprising concurrently heating and pressing a powder mixture consisting essentially of 14–57% Si, 14–65% individually of each of the metals Fe and Mo, and from about 5–20% of ZrO₂, wherein the size of all particles is less than about 75 microns and of which at least 75% by weight are less than about 5 microns, in a staged sequence consisting of maintaining a pressure of about 1000 p.s.i. while heating said powder mixture from room temperature to about 1000° C., then increasing the pressure to about 2000 p.s.i. and maintaining said last-mentioned pressure while raising the temperature from said 1000° C. to a level of 1300° C., and, finally, increasing the pressure to about 3000 p.s.i. while maintaining the temperature at said level of 1300° C., maintaining said last-named pressure and temperature substantially constant for a period of about 15 minutes to effect completion of the sintering and alloying of said powder mixture.

References Cited in the file of this patent

UNITED STATES PATENTS

| | | |
|---|---|---|
| 2,866,259 | Bechtold | Dec. 30, 1958 |
| 2,878,113 | Bechtold | Mar. 17, 1959 |
| 2,982,619 | Long | May 2, 1961 |

UNITED STATES PATENT OFFICE
CERTIFICATE OF CORRECTION

Patent No. 3,110,092                        November 12, 1963

Max F. Bechtold et al.

It is hereby certified that error appears in the above numbered patent requiring correction and that the said Letters Patent should read as corrected below.

Column 16, line 74, for "substantial" read -- substantially --; column 17, line 11, for "Fe and Fi" read -- Fe and Ti --; line 12, for "hte" read -- the --; line 19, for "compositon" read -- composition --.

Signed and sealed this 5th day of May 1964.

(SEAL)
Attest:
ERNEST W. SWIDER

Attesting Officer

EDWARD J. BRENNER
Commissioner of Patents